Sept. 13, 1932.  J. A. CASALETTO  1,877,385
AUTOMATIC TAKE-UP MECHANISM
Filed Oct. 6, 1930
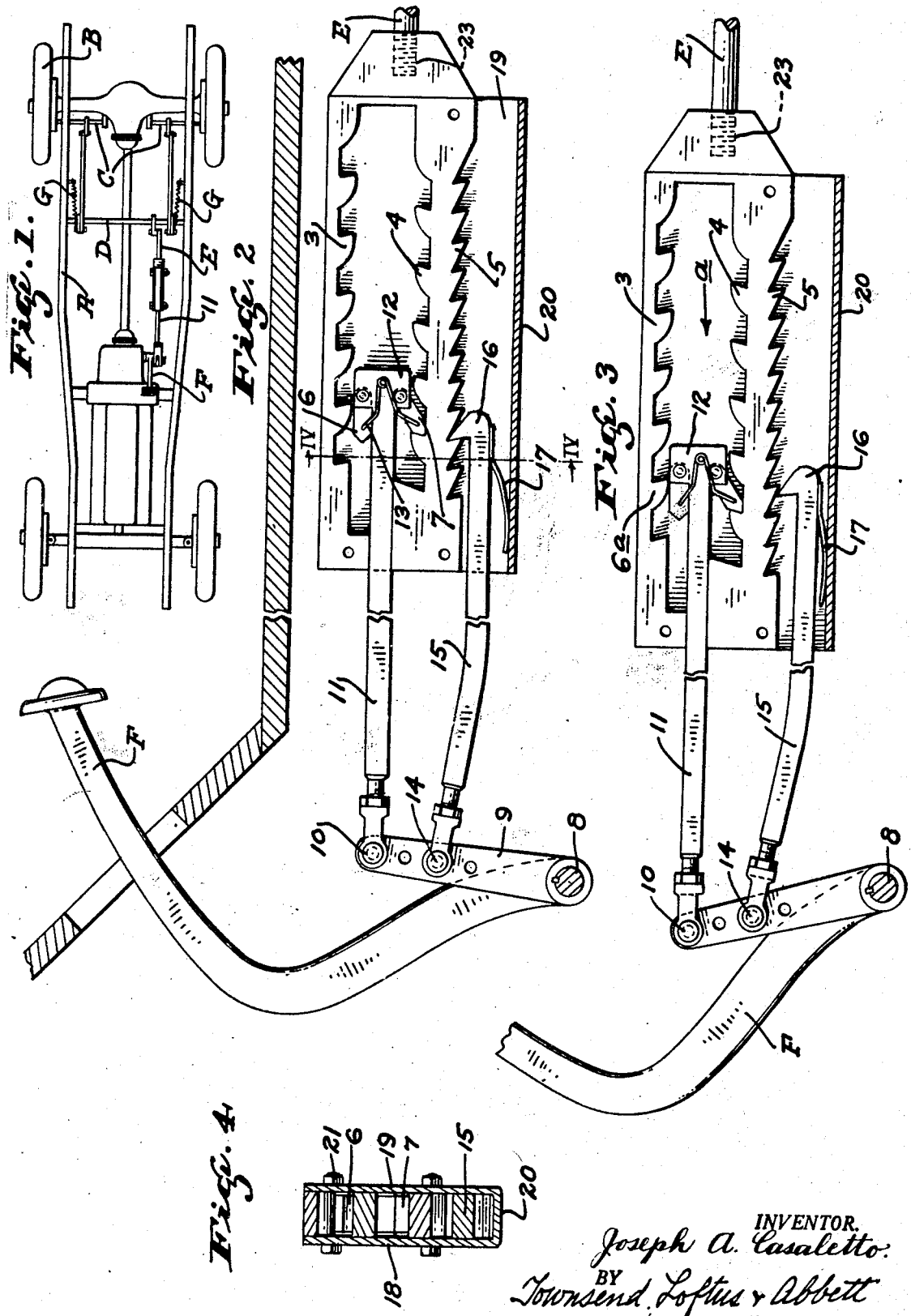
INVENTOR.
Joseph A. Casaletto
BY
Townsend, Loftus & Abbett
ATTORNEYS.

Patented Sept. 13, 1932

1,877,385

UNITED STATES PATENT OFFICE

JOSEPH A. CASALETTO, OF LOS GATOS, CALIFORNIA

AUTOMATIC TAKE-UP MECHANISM

Application filed October 6, 1930. Serial No. 486,714.

This invention relates to brake mechanisms for vehicles and the like, and particularly to means whereby wear of the brake shoes and connected operating mechanism is automatically taken-up.

Ordinary brakes as used on automobiles and like vehicles consist of brake drums, bands or shoes movable into and out of engagement therewith, and a series of levers and links whereby the bands or shoes are actuated either by a foot pedal or a brake lever.

The foot pedal, together with the brake bands or shoes actuated thereby, are in constant use and are subject to considerable wear and as wear gradually increases, the movement of the foot pedal increases proportionately until a point is reached where the foot pedal actually engages the foot boards where further movement is stopped. If the average driver would immediately, or at least within the next day or two, see to it that the brakes were readjusted, or in other words, take up the slack caused by wear, serious results and accidents would be prevented. The average driver will, however, wait too long and the first thing he knows an emergency arises where responsive and positive action of the brakes is required. The brakes and connected mechanisms are too slack and as such do not respond as quickly as they should and the result is a rear end collision, a pedestrian is run down, etc.

The object of the present invention is to overcome the objections above referred to by providing means for automatically taking up slack as it develops. The invention, more specifically stated, comprises a brake pedal or the like, a link mechanism connecting the pedal and brake mechanism to be actuated, and means interposed in the link connection whereby slack is automatically taken up as wear takes place.

The invention is shown by way of illustration in the accompanying drawing, in which Fig. 1 is a plan view showing the manner in which the automatic take-up is applied to the brake mechanism of an automobile, Fig. 2 is a side elevation of the take-up mechanism and the foot pedal whereby it is actuated, said view showing the take-up mechanism in released position, Fig. 3 is a similar view showing the position of the take-up mechanism during application of the brake, Fig. 4 is a cross section taken on line IV—IV of Fig. 2.

Referring to the drawing in detail and particularly Figs. 1 to 3, A indicates the frame of a motor vehicle, B the rear wheels equipped with the usual brake drums and bands or shoes, C the brake actuating shafts, D the equalizer, and E the link whereby movement is transmitted from the foot pedal F to the equalizer.

The take-up mechanism forming the subject matter of the present application is best illustrated in Figs. 2 to 4, inclusive. It consists of an elongated flat plate, the center portion of which is cut out to form upper and lower rack teeth as indicated at 3 and 4. Rack teeth are also cut on the lower edge of the plate as indicated at 5 and it should be noted that the teeth 3 and 4 are staggered with relation to each other so as to be intermittently engaged by pawls 6 and 7 as will hereinafter be described.

The foot pedal employed in the present instance is indicated at F. It is secured on a shaft 8 in the usual manner and this shaft carries a crank arm 9. The upper end of the crank arm is pivotally connected as at 10 with a rod 11 and this is connected with a head member 12 which carries the pawls 6 and 7, these pawls being maintained in engagement with one set of rack teeth or another through means of spring arms 13. Pivotally secured to the crank arm 9 as at 14 at a point below the pivotal connection 10 is a second rod 15. This rod terminates in a pawl 16 which engages the rack teeth 5 and the pawl is held in engagement with said teeth by means of a flat spring arm 17. The rods 11 and 15, together with the pawls 6 and 7, are held against lateral movement by side plates 18 and 19, which are connected at their lower edge by a bottom plate 20. The plates 18 and 19 are secured to the rack plate by bolts or screws such as shown at 21 and as such forms a housing which secures the rods and pawls against lateral movement, the bottom portion 20 of the plates at the same time functioning as a support for the spring 17.

The take-up mechanism just described is interposed in the link E. That is, in ordinary plates link E extends to the crank arm 9 and is there pivotally secured. In the present instance, link E is cut short and connected to the take-up mechanism at the point indicated at 23 and the rods 11 and 15 form the other connection. In actual practice, Fig. 2 shows a normal position of the brake pedal, that is the position in which the brakes are released, and Fig. 3 shows braking position.

The take-up mechanism functions as follows: With the brake pedal and connected mechanism in normal or released position, pawls 7 and 16 engage the rack bars 4 and 5 as shown, hence if the brake pedal is depressed the pawls and rack bars will function as a positive connection between the rods 11 and E and motion will accordingly be transmitted to the equalizing mechanism and to the brake actuating shaft C thereby applying or setting the brakes and if the brake pedal is released these points will return to normal position due to the tension of the pull-back springs indicated at G. In normal operation pawl 16 does not function it merely slides back and forth on one or another of the rack teeth 5, but as the brake mechanism is in continuous use and wear gradually accumulates the stroke or movement of the foot pedal increases. It should be noted that the distance from the center point of shaft 8 to the connection 14 is less than the distance to the connection 10, hence when the brake pedal is depressed rod 11 will move a greater distance than rod 15. In other words, rod 11 tends to pull the take-up mechanism, together with the link E, in the direction of arrow *a*, see Fig. 3, a greater distance than the travel of rod 15 with connected pawl 16, hence pawl 16 slides rearwardly with relation to the tooth it happens to engage and when the wear of the brakes and the connected mechanism exceeds a certain or predetermined amount the brake pedal will be moved to a position where pawl 16 will finally slip over the tooth it happens to engage and thus take-up that much slack. When the brake pedal is released, if pawl 16 has connected a tooth the pull-back springs G will return the rack bars a greater distance than was previously the case, hence rod 11, together with the pawls 6 and 7 carried thereby, will move in a direction opposite to arrow *a* and pawl 7 will be released while pawl 6 will move into engagement with the next tooth or that indicated at 6*a*. The rack teeth 3 and 4 are staggered with relation to each other thus causing the pawls 6 and 7 to intermittently engage. This is important as it permits a closer spacing of the rack teeth 5 and thereby permits the automatic take-up mechanism to automatically take-up wear at shorter intervals than would otherwise be possible.

While the automatic take-up mechanism has been shown and described as applied to the brake mechanism of an automobile or the like, it is obvious that it may be applied wherever a brake mechanism is employed, for instance, on winches, brake actuated hoists, etc., and while certain features of the present invention are more or less specifically described, I wish it understood that various changes may be resorted to within the scope of the appended claims. Similarly, that the materials and finishes of the several parts employed may be such as the manufacturer may decide, or varying conditions or uses may demand.

Having thus described my invention, what I claim and desire to secure by Letters Patent is—

1. A brake mechanism comprising a brake, a brake lever, a pivotally mounted shaft to which the brake lever is secured, a crank arm secured on said shaft and movable in unison with the brake lever, a pair of rods pivotally connected to said crank arm, one at the outer end thereof and one at a point intermediate the shaft and the outer end, a take-up device including a pair of toothed rack bars, a pawl on the outermost rod engageable with one of said rack bars, a pawl on the inner rod engaging the other rack bar, and a link mechanism connected with said take-up device and the brake.

2. In a brake take-up device of the character described, a double rack bar having oppositely disposed rows of teeth, a rod slidable within said double rack bar, and a pair of pawls carried by said rod and engageable upon sliding movement of the rod, one with each of said rows of teeth.

3. In a brake take-up device of the character described, a double rack bar having oppositely disposed rows of teeth, a rod slidable within said double rack bar, and a pair of pawls carried by said rod and engageable upon sliding movement of the rod, one with each of said rows of teeth in alternate succession.

JOSEPH A. CASALETTO.